US008783421B2

(12) United States Patent
Mueller et al.

(10) Patent No.: US 8,783,421 B2
(45) Date of Patent: Jul. 22, 2014

(54) BRAKE DEVICE

(75) Inventors: Jochen Mueller, Filderstadt (DE); Juergen Herkommer, Stuttgart (DE); Guenter Scholz, Nuertingen (DE); Dieter Held, Kohlberg (DE)

(73) Assignee: Thyssenkrupp Aufzugswerke GmbH, Neuhausen (DE)

( * ) Notice: Subject to any disclaimer, the term of this patent is extended or adjusted under 35 U.S.C. 154(b) by 199 days.

(21) Appl. No.: 11/858,390

(22) Filed: Sep. 20, 2007

(65) Prior Publication Data

US 2009/0078510 A1 Mar. 26, 2009

(51) Int. Cl.
*F16D 55/08* (2006.01)
*F16D 55/00* (2006.01)

(52) U.S. Cl.
USPC ............................ 188/72.1; 188/17; 188/73.1

(58) Field of Classification Search
USPC ........... 188/71.1, 72.1, 73.1, 17, 18 A, 218 R, 188/218 XL; 187/254, 351
See application file for complete search history.

(56) References Cited

U.S. PATENT DOCUMENTS 3,497,046 A * 2/1970 Schilling .................... 192/85.53
3,758,799 A 9/1973 Dochterman et al.
4,865,160 A * 9/1989 Casey ......................... 188/18 A
5,154,261 A * 10/1992 Tanaka et al. ................. 188/171
5,435,209 A * 7/1995 Wittur ......................... 74/606 R
5,631,510 A * 5/1997 Flaig et al. ...................... 310/77
5,789,832 A * 8/1998 Hwang ........................... 310/43
5,799,619 A * 9/1998 Hoshino et al. ................. 122/26
5,982,060 A 11/1999 Hakala et al.
6,371,248 B1 * 4/2002 Cholinski ..................... 187/254
6,578,672 B1 6/2003 Miyoshi
6,776,396 B2 * 8/2004 Miyoshi et al. ............... 254/276
7,165,653 B2 * 1/2007 Rennetaud .................... 187/254
2006/0151254 A1 * 7/2006 Sevilleja-Perez et al. .... 187/351
2006/0169545 A1 * 8/2006 Hisamitsu ..................... 187/401

FOREIGN PATENT DOCUMENTS

DE A 102005022897 11/2006
EP 0841 283 A 5/1998
EP 1 069 068 A 1/2001
EP 1 092 876 A 4/2001

* cited by examiner

*Primary Examiner* — Melody Burch
(74) *Attorney, Agent, or Firm* — Lathrop & Gage LLP

(57) ABSTRACT

A brake device for an elevator system includes a brake disk adapted to interact with a brake rotor concentrically disposed on an extension of a traction sheave. A traction sheave adapted to be concentrically disposed on a shaft of an elevator system driving apparatus includes a main body including an integrally formed extension adapted to interact with a brake device.

23 Claims, 4 Drawing Sheets

BRAKE DEVICE

BACKGROUND OF THE INVENTION

The present invention relates to a brake device for an elevator system.

Elevator systems are presently provided with a plurality of brake devices which are designed for use in normal operation of the elevator such as holding the cabin in place when it stops at a landing and which are designed for use in emergency situations, as for example to stop and to hold the cabin and/or the counterweight.

A brake device in conjunction with a driving apparatus for an elevator is disclosed in U.S. Pat. No. 6,578,672. The brake device comprises a brake disk secured to a side of the inner circumferential portion of a sheave with fastening bolts, constructed so as to extend in a radial direction of the sheave and disposed concentrically with the input shaft, brake pads disposed on both sides of the brake disk and constructed so as to be activated by virtue of a pressure applied from a brake main body, and a supporting arm extending in a radial direction from the supporting member for supporting the brake main body.

DE-A-10,2005,022,897 discloses an external-mounted brake which is designed as an electromagnetically releasing spring-pressure brake for mounting on a driving sheave or a driving sheave shaft of already existing elevators which are operated with cables passing over a driving sheave. The brake described is situated concentric to the central axis of the driving sheave or driving sheave shaft on a separate base of the structure on the free side of the driving sheave and is fastened in a stationary and rotationally fixed manner. The rotor of the brake is connected in an essentially rotationally fixed manner to the free end of the driving sheave or the driving sheave shaft in order to transmit the braking torque of the external-mounted brake to the driving sheave.

The brake devices in the mentioned documents, however, suffer from a problem that the axial length of the device is large.

BRIEF SUMMARY OF THE INVENTION

The present invention was made in view of the above problem and an object thereof is to provide a brake device for an elevator system, the axial length of which is small.

To achieve the above mentioned object, the present invention provides for a break device for an elevator system comprising a brake disk adapted to interact with a brake rotor concentrically disposed on an extension of a traction sheave. The brake rotor is a separate component concentrically disposed on the extension of the traction sheave. The diameter of the extension is not significantly different to the diameter of a shaft carrying the traction sheave.

The brake device according to the invention provides for a compact driving apparatus having a small diameter and a reduced length compared to the solutions known. Furthermore, a reduced number of components is necessary to transmit the braking torque. A reduced number of components helps to reduce the number of failure modes.

In addition, there is provided a brake device for an elevator system, wherein both the extension of the traction sheave and the brake rotor are toothed. The toothings of the extension and the brake rotor are arranged and adapted to be engaged with each other. Therefore, a secure connection between the extension and the brake rotor is provided and rotation of the extension is transferred to the brake rotor.

Furthermore, there is provided a brake device for an elevator system, wherein the brake rotor is adapted to be pressed against a brake frame. This brake frame can be integrally formed with a housing of a driving apparatus of the elevator system. Alternatively, the brake frame is fastened by screws or bolts to the housing. The braking torque provided by the brake rotor is transferred via the brake frame to the housing.

The brake frame surrounding the traction sheave can serve as a protection against ropes leaving the traction sheave and/or the grooves of the traction sheave.

Additionally, the brake frame acts as a dropping protection for the traction sheave.

In addition, there is provided a brake device for an elevator system, wherein said traction sheave is an overhung-mounted traction sheave.

Furthermore, the invention provides for a traction sheave in a driving apparatus for an elevator system. The traction sheave is especially for use in connection with a brake device mentioned above and adapted to be concentrically disposed on a shaft of the driving apparatus and comprises a disk-shaped main body being provided with an integrally formed extension which in turn is adapted to interact with a brake device.

According to the invention, rotation of the shaft such as the drive shaft of the driving apparatus is transferred to the traction sheave through frictional and/or positive transmission.

In addition, the invention provides for a traction sheave for a driving apparatus, wherein said extension is toothed, i.e. the extension is circumferentially provided with external teeth and, therefore, the extension is provided with an external toothing. The extension can carry a brake rotor which in turn, upon braking, gets in contact with a brake disk. In this case the brake rotor and the brake disk form the brake device.

The braking torque provided by the brake arrangement by pressing the brake disk against the brake rotor which again is pushed against the brake frame. The braking torque is transferred via the brake frame to the housing of the driving apparatus.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown.

IN THE DRAWINGS

Figure 1:
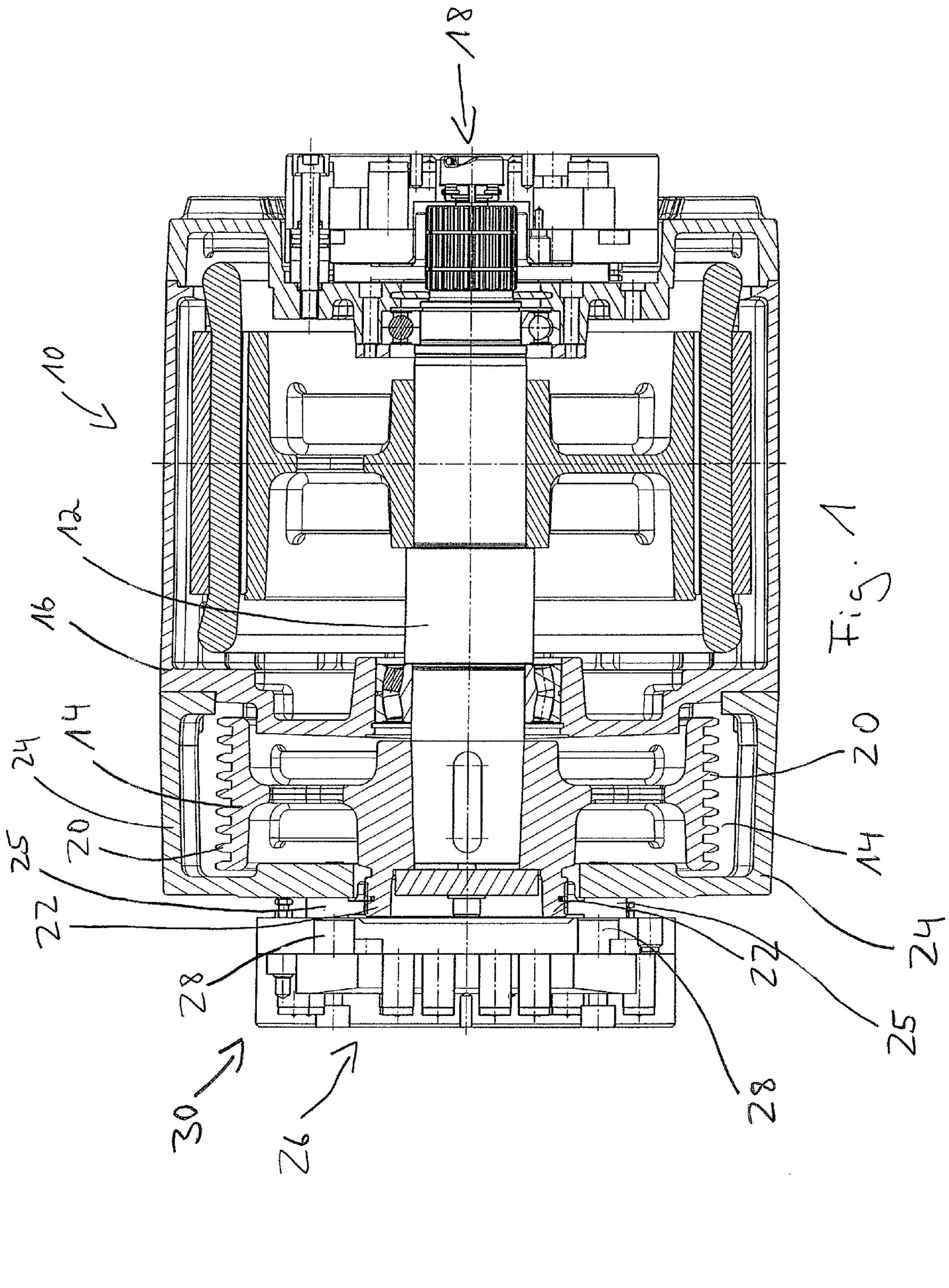
Figure 2:
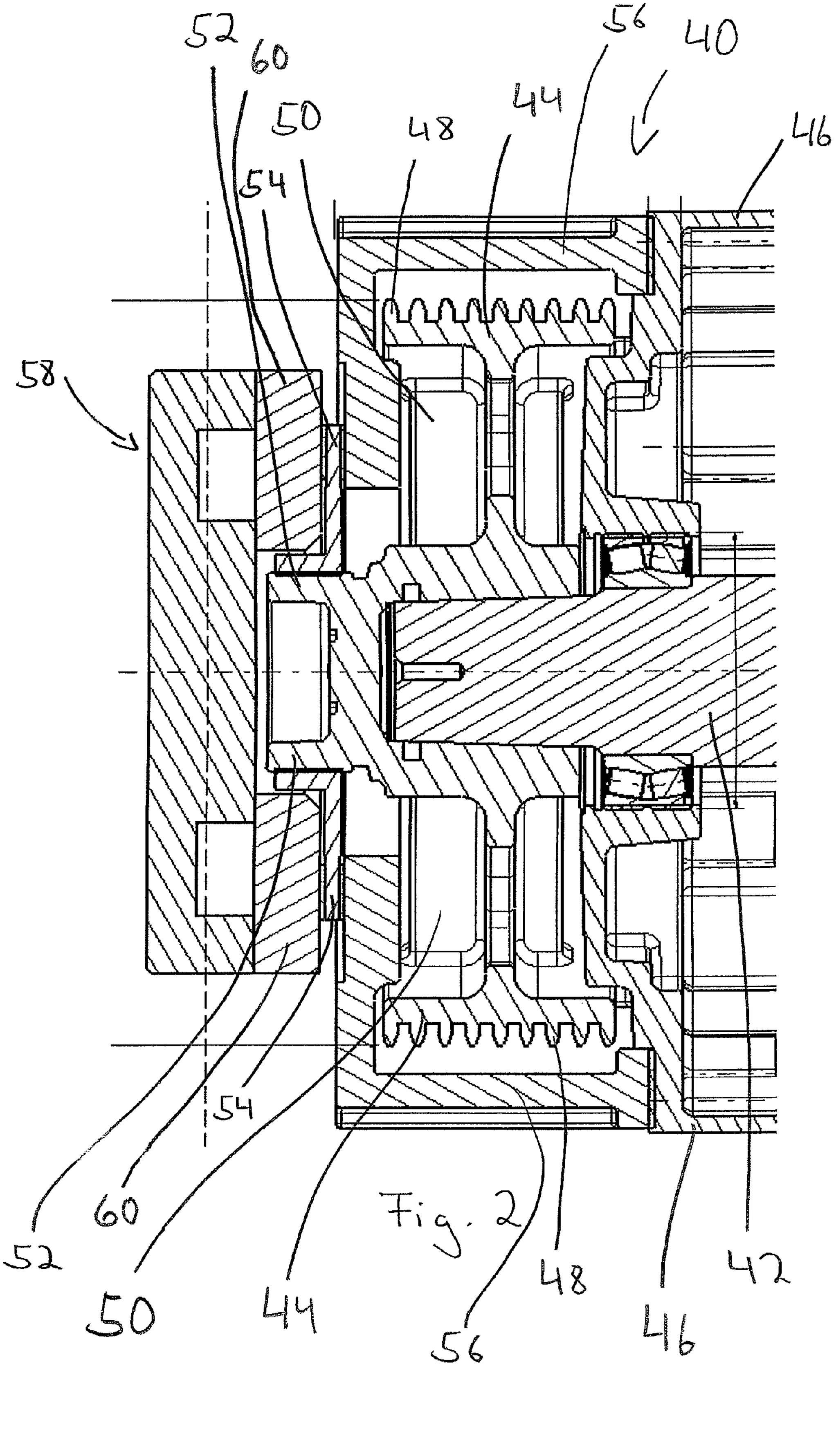
Figure 3:
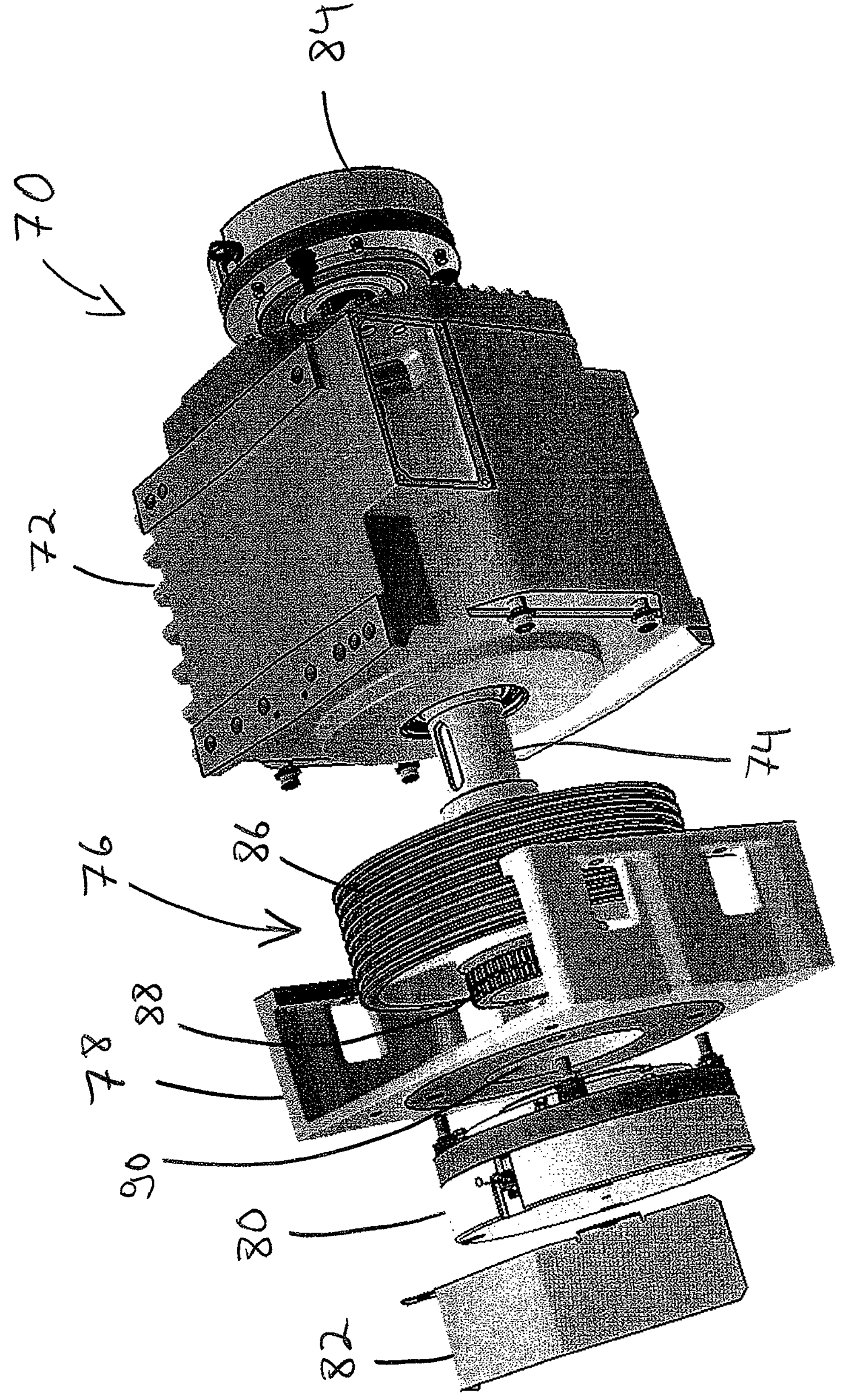
Figure 4:
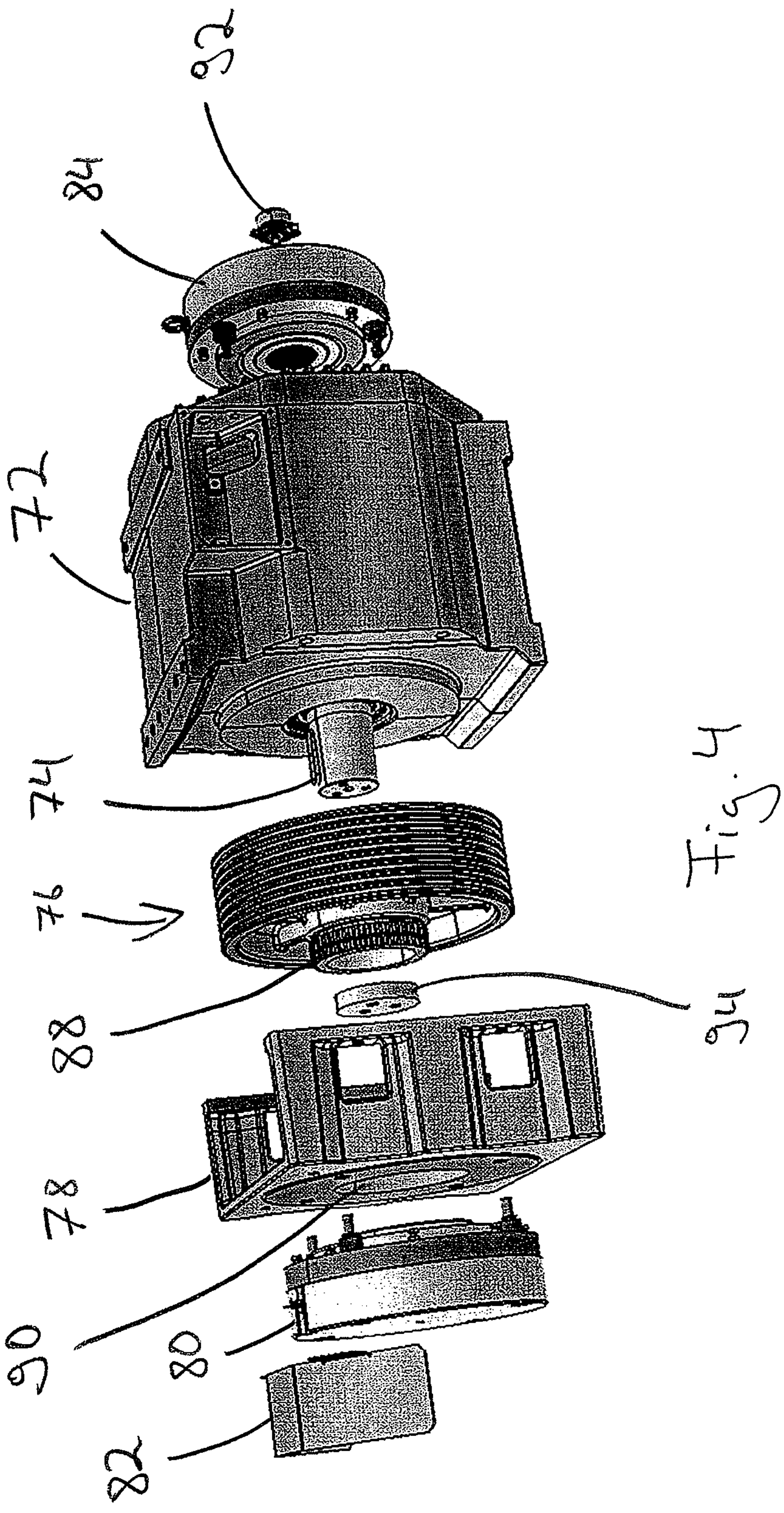

FIG. 1 is a side cross-sectional view of a driving apparatus for an elevator system showing a mode for carrying out the invention;

FIG. 2 is a side cross-sectional view of a portion of a driving apparatus for an elevator system showing a traction sheave provided on a shaft of the driving apparatus;

FIG. 3 is a perspective view of a driving apparatus for an elevator system comprising a brake device according to the invention showing a mode for carrying out the invention;

FIG. 4 is an exploded view of the driving apparatus in FIG. 3.

DETAILED DESCRIPTION OF THE INVENTION

Referring to the accompanying drawings, a mode for carrying out the invention will be described below. FIG. 1 shows an embodiment of a driving apparatus generally denoted by the numeral 10. The driving apparatus 10 comprises a motor shaft 12 carrying a traction sheave 14, a housing 16, and on the right end side an operating brake 18 designed for use in normal operation of the driving apparatus 10 such as holding the cabin in place when it stops at a landing.

The traction sheave 14 can circumferentially be provided with grooves 20 for transmitting the rotational movement of the motor shaft 12 to elements to be driven such as a rope. Rotation of the motor shaft 12 is transferred to the traction sheave 14 through frictional transmission.

Furthermore, the traction sheave 14 is provided with an integrally formed extension 22 which serves as an extension of the motor shaft 12 and rotates synchronously to the motor shaft 12. A brake frame 24 partially surrounding the traction sheave 14 is connected to the housing 16 of the driving apparatus 10 by fastening elements, e.g. screws or bolts. Alternatively the brake frame 24 is integrally formed with the housing 16.

In addition, the traction sheave 14 carries a brake rotor 25 which is connected to the traction sheave 14 by corresponding toothings. Therefore, the brake rotor 25 rotates in synchronicity to the motor shaft 12 and the traction sheave 14.

The driving apparatus 10 shown is also provided with an emergency brake 26 opposite to the operating brake 18. This emergency brake 26 comprises a brake disk 28 which, upon braking, moves in axial direction of the driving shaft 12 rightwards and presses the brake rotor 25 against the brake frame 24. The braking torque provided by the emergency brake 26 is transferred via the brake frame 24 to the housing 16 of the driving apparatus 10. The brake rotor 25 and the brake disk 28 interacting with the extension 22 and the brake frame 24 form a brake device 30.

The emergency brake 26 shown is designed for use in emergency situations such as stopping and holding the cabin and/or the counterweight. In combination with the operating brake 18, a secure operation of the driving apparatus 10 and, therefore, a safe operation of the elevator system is guaranteed. The compact structure of the driving apparatus 10 is obtained by the arrangement of the emergency brake 26 and the brake device 30 close to the motor shaft 12 providing a reduced axial length of the driving apparatus 10.

Referring now to FIG. 2, there is shown a portion of a driving apparatus generally denoted by the numeral 40 which, in this case, is built as a gearless driving apparatus 40. The drawing shows a motor shaft 42 which is concentrically provided with a traction sheave 44 and a housing 46.

The outer circumference of the traction sheave 44 has teeth 48 for transmitting the rotational movement of the motor shaft 42 via the traction sheave 44 to elements (not shown) to be driven. The circumferential grooves of the traction sheave allows for coupling said elements to the traction sheave 44.

The traction sheave 44 comprises a essentially disk-shaped main body 50 and an integrally formed extension 52. This extension 52 forms an extension of the motor shaft 42 in axial direction. Additionally, rotation of the motor shaft 42 of the driving apparatus 40 is transferred to the extension 52 through frictional transmission between the motor shaft 42 and the traction sheave 44.

The integrally formed extension 52 carries a brake rotor 54 which is connected to the extension 52 by toothing. As a result, rotation of the motor shaft 42 is transferred to the traction sheave 44 and therefrom to the extension 52 and via the toothing to the brake rotor 54.

Furthermore, the traction sheave 44 is surrounded by a brake frame 56 which is securely fixed to the housing 46 of the driving apparatus 40. This brake frame 56 also serves as a protection against dropping of a rope running on the overhung-mounted traction sheave 44 as a protection from ropes leaving the sheave and/or the grooves of the overhung-mounted traction sheave.

The drawing also shows a brake 58 for emergency cases. The brake 58 shown comprises a brake disk 60 which interacts with the brake rotor 54 forming a brake device. Upon braking, the brake disk 60 moves to the right and contacts the brake rotor 54. The brake rotor 54 is pushed to the right and pressed against the brake frame 56. The braking torque provided by the brake 58 is transferred via the brake frame 56 to the housing 46 of the driving apparatus 40.

FIG. 3 shows in a perspective view a driving apparatus generally denoted by the numeral 70 for an elevator system in a disassembled state. The drawing shows a housing 72 enclosing a motor (not shown), a motor shaft 74, a traction sheave 76, a brake frame 78, an emergency brake 80, a covering 82, and an operating brake 84.

The motor within the housing 72 drives the motor shaft 74 to move the cabin of the elevator system in selected directions to selected landings. In order to hold the cabin in place when it stops at a landing, there is provided the operating brake 84 which holds the motor shaft 74 and prevents the motor shaft 74 from rotating. Thus, the operating brake 84 is designed for use in normal operation of the elevator system.

In emergency cases, as for example to stop and hold the cabin and/or the counterweight, there is provided the emergency brake 80 which is disposed opposite to the operating brake 84 close to one end of the driving shaft 74 of the driving apparatus 70.

The traction sheave 76 with grooves comprises a essentially disk-shaped main body 86 provided with an integrally formed extension 88 which also circumferentially is provided with toothing. The extension 88 shown serves as an extension of the motor shaft 74 and rotates synchronously to the motor shaft 74.

The brake frame 78 has an opening 90 through which the extension 88 is passed in assembled condition. Afterwards the brake rotor is put on the extension 88. The diameter of the brake rotor is bigger than the diameter of the opening 90 of the brake frame 78.

The extension 88 can carry a brake rotor (not shown) which is concentrically disposed to the motor shaft 74 and, therefore, rotation of the motor shaft 74 is transferred via the extension 88 of the traction sheave 76 to the brake rotor. The toothing between the brake rotor and the extension 88 ensures a safe transmission of the force of the motor to the brake rotor which can be made of steel or aluminium.

Upon braking, a brake disk (not shown) of the emergency brake 80 presses the brake rotor against the brake frame 78. The braking torque is transferred via the brake frame 78 to the housing 72 and via the extension 88 and the traction sheave 76 to the motor shaft 74.

The covering 82 serves an additional protection for the emergency brake 80.

Referring now to FIG. 4, there is shown the driving apparatus 70 of FIG. 3 in an exploded view. The drawing shows the housing 72, the motor shaft 74, the traction sheave 76 comprising the main body 86 and the integrally formed extension 88, the brake frame 78 having the opening 90, the emergency brake 80, the covering 82, and the operating brake 84. Furthermore, the drawing shows an encoder 92 and a flange 94.

The diameter of the opening 90 in the brake frame 78 is smaller than the diameter of the extension 88 and, therefore, the extension 88 can be moved through the opening 90. Afterwards the brake rotor is put on the extension 88. The diameter of the brake rotor is bigger than the diameter of the opening 90 of the brake frame 78 so that, upon braking, the brake rotor is pressed against the brake frame.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

The invention claimed is:

1. A brake device for an elevator system, comprising:

a housing enclosing a motor;

a shaft of the motor extending in an extension direction along a rotation axis from the housing;

a traction sheave concentrically disposed on the shaft, the traction sheave including an integrally formed extension, the extension extending from an end of the traction sheave opposite to the housing;

a brake frame surrounding the traction sheave and securely fixed to the housing;

a brake rotor being a separate component from the traction sheave and from the extension and concentrically disposed on the extension, the brake frame disposed between the housing and brake rotor;

a brake disk adapted to interact with the brake rotor that is between the brake disk and the brake frame; and a first operational configuration and a second operational configuration, the first operational configuration being different from the second operational configuration, wherein:

in the first operational configuration, the brake rotor has a first rotor position along the rotation axis in the extension direction and the brake disk has a first disk position along the rotation axis in the extension direction, in the second operational configuration, the brake rotor has a second rotor position along the rotation axis in the extension direction and the brake disk has a second disk position along the rotation axis in the extension direction, and wherein the first rotor position is different from the second rotor position with respect to the brake frame, wherein the first disk position is different from the second disk position with respect to the brake frame, wherein, in the first operational configuration, the brake disk and the brake rotor are in direct contact, wherein, in the second operational configuration, the brake disk and the brake rotor are not in direct contact, wherein both the extension and the brake rotor are toothed, wherein the shaft is disposed through the housing into the brake frame, and having one shaft end terminating within the brake frame, and wherein the extension extends from the one shaft end through a portion of the brake frame opposite to the housing.

2. The brake device of claim 1, wherein teeth of the extension are located around an external circumference of the extension and are structured to operably interact with corresponding teeth located on an internal dimension of the brake rotor.

3. The brake device of claim 1, the brake rotor being adapted to be pressed against the brake frame by the brake disk.

4. The brake device of claim 3, wherein said brake frame is structurally interposed to prevent dropping of a rope from the traction sheave.

5. The brake device of claim 3, wherein said brake frame is structurally interposed as a dropping protection for the traction sheave.

6. The brake device of claim 1, wherein said traction sheave is an over-hung-mounted traction sheave.

7. A traction sheave adapted to be concentrically disposed on a shaft of a driving apparatus of an elevator system to interact with a brake device including a brake frame, a brake rotor, and a brake disk, the traction sheave comprising:

a main body including an integrally formed extension extending in an extension direction from a terminal end of the shaft and along a rotation axis of the shaft, the extension adapted to interact with the brake device, the main body including an open portion for accommodating the terminal end of the shaft within the brake frame; and a first operational configuration and a second operational configuration, the first operational configuration being different from the second operational configuration, wherein, in the first operational configuration, the traction sheave is structurally configured to have the brake rotor in a first rotor position along the rotation axis in the extension direction, wherein, in the second operational configuration, the traction sheave is structurally configured to have the brake rotor in a second rotor position along the rotation axis in extension direction, the second rotor position being different from the first rotor position with respect to the brake frame, wherein the extension extends through a side of the brake frame between the main body and the brake rotor when the brake device is in an assembled condition, wherein the brake rotor is a separate component from the traction sheave and from the extension, wherein, in the first operational configuration, the brake disk and the brake rotor are in direct contact, wherein, in the second operational configuration, the brake disk and the brake rotor are not in direct contact, and wherein said extension includes external teeth around a circumference of the extension.

8. The traction sheave of claim 7, wherein said extension carries the brake rotor being toothed such that rotation of the traction sheave is transferred to the brake rotor through the extension.

9. A brake device for an elevator system, comprising:

a housing enclosing a motor;

a shaft of the motor, the shaft extending in an extension direction along a rotation axis from the housing;

a traction sheave concentrically disposed on the motor shaft, the traction sheave including a main body with an extension along the rotation axis, the extension extending from an end of the traction sheave opposite to the housing;

a brake frame surrounding the traction sheave and securely fixed to the housing;

a brake rotor being a separate component from the traction sheave and from the extension and concentrically disposed on the extension of the traction sheave, the brake frame positioned between the brake rotor and the main body, the main body being positioned between the brake rotor and the housing;

a brake disk adapted to interact with the brake rotor, the brake disk being movable in the axial direction, the brake rotor positioned between the brake disk and the brake frame; and a first operational configuration, a second operational configuration, and a third operational configuration, the first operational configuration, the second operational configuration, and the third operational configuration being different from each other, wherein:

in the first operational configuration, the brake rotor has a first rotor position along the rotation axis in the extension direction and the brake disk has a first disk position along the rotation axis in the extension direction, in the second operational configuration, the brake rotor has a second rotor position along the rotation axis in the extension direction and the brake disk has a second disk position along the rotation axis in the extension direction, in the third operational configuration, the brake rotor has a third rotor position along the rotation axis in the extension direction and the brake disk has a third disk position along the rotation axis in the extension direction, and wherein the first rotor position is the same as the second rotor position with respect to the brake frame, wherein the first disk position is different from the second disk position with respect to the brake frame, wherein the third rotor position is different from the first rotor position with respect to the brake frame, wherein both the extension and the brake rotor are toothed such that rotation of the motor shaft is transferred to the brake rotor through the extension, wherein the shaft is disposed through the housing into the brake frame, and having one shaft end terminating within the main body, and wherein the extension extends from the one shaft end through a portion of the brake frame opposite to the housing.

10. The brake device of claim 9, wherein toothing of the extension is distributed around an external circumference of the extension and is structurally configured to interact with corresponding toothing located on an internal dimension of the brake rotor.

11. The brake device of claim 9, the brake rotor being adapted to be pressed against a brake frame by the brake disk.

12. The brake device of claim 11, wherein said brake frame is structurally interposed to prevent dropping of a rope from the traction sheave.

13. The brake device of claim 11, wherein said brake frame is structurally interposed as a dropping protection for the traction sheave.

14. The brake device of claim 9, wherein said traction sheave is an over-hung-mounted traction sheave.

15. The brake device of claim 1, wherein the extension extends through an opening of the brake frame.

16. The brake device of claim 15, wherein the opening has a smaller diameter than the brake rotor, but a larger diameter than the extension.

17. The traction sheave of claim 7, wherein the extension extends through an opening of the brake frame.

18. The brake device of claim 17, wherein the opening has a smaller diameter than the brake rotor, but a larger diameter than the extension.

19. The brake device of claim 9, wherein the extension extends through an opening of the brake frame.

20. The brake device of claim 19, wherein the opening has a smaller diameter than the brake rotor, but a larger diameter than the extension.

21. The brake device of claim 1, wherein the brake rotor is in direct contact with the brake frame in the second operational configuration.

22. The traction sheave of claim 7, wherein the brake rotor is in direct contact with the brake frame in the second operational configuration.

23. The brake device of claim 9, wherein the brake rotor is in direct contact with the brake frame in the second operational configuration.

* * * * *